(12) United States Patent
Nakahara

(10) Patent No.: US 6,195,509 B1
(45) Date of Patent: Feb. 27, 2001

(54) EXPOSURE CONTROL APPARATUS FOR A CAMERA

(75) Inventor: Naoto Nakahara, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/409,082

(22) Filed: Sep. 30, 1999

(30) Foreign Application Priority Data

Oct. 1, 1998 (JP) .................................................. 10-279990

(51) Int. Cl.$^7$ .................................................. G03B 13/34
(52) U.S. Cl. .................. 396/100; 396/121; 396/165; 396/234
(58) Field of Search .................. 396/100, 213, 396/234, 233, 165, 121, 122, 123

(56) References Cited

U.S. PATENT DOCUMENTS

| 4,664,495 | 5/1987 | Alyfuku et al. | 396/234 |
| 4,878,081 | 10/1989 | Kishida et al. | 396/106 |
| 5,923,910 | 7/1999 | Nakahara et al. | 396/124 |

FOREIGN PATENT DOCUMENTS

| 440171 | 8/1991 | (EP) . |
| 570968 | 11/1993 | (EP) . |
| 5-68203 | 3/1993 | (JP) . |

OTHER PUBLICATIONS

English language abstract of JP 5–68203.

*Primary Examiner*—W. B. Perkey
(74) *Attorney, Agent, or Firm*—Greenblum & Bernstein, P.L.C.

(57) ABSTRACT

An exposure control apparatus for a camera includes a focus detection device which receives object light within a predetermined distance measuring area to measure the object distance, a photometering device which receives object light within a plurality of photometering areas to measure the object brightness, and a backlight detection device which obtains a main photometering value based on the object light received by the focus detection device and for detecting the presence of backlight based on the main photometering value and a reference photometering value measured by the photometering device.

7 Claims, 11 Drawing Sheets

EXPOSURE CONTROL APPARATUS FOR A CAMERA

BACKGROUND OF THE INVENTION

1. Field of the Invention

The present invention relates to an exposure control apparatus for a camera having a focus detection device in which an exposure can be precisely determined by detecting backlight.

2. Description of the Related Art

In a conventional camera having a multi-point object-distance measuring device, the focusing operation upon an object to be taken is carried out by employing, for example, the smallest object distance (closest object) selected from among object distances obtained by a plurality of distance measuring areas.

The brightness of the object is calculated based on an algorithm for a predetermined photometering system, such as an averaged overall photometering system, a center-weighted photometering system, or a spot photometering system, using the measurements of the object brightness obtained in a plurality of split photometering areas (the number of which is usually larger than the number of the distance measuring areas) which are partly overlapped on the distance measuring areas. To detect backlight, the difference in the measurement between the central photometering area and the remaining photometering area(s) is calculated, wherein the difference is checked to determine whether the difference is above a predetermined value in order to determine the presence of backlight. Namely, the focusing is carried out based on the measurement of the object distance in one distance measuring area selected from the plurality of distance measuring areas, and the detection of backlight is carried out based on the measurements of the plurality of photometering areas, made independently from the selected distance measuring area.

However, in such a known exposure control apparatus for a camera, a plurality of distance measuring areas are partly overlapped on a plurality of photometering areas. However, the detection of backlight for the object to be taken can be inaccurate since the judgment is carried out based on the plurality of photometering areas, independent of the distance measuring area selected for the focusing operation. Consequently, an accurate exposure value cannot be obtained. For instance, assuming that there are first to sixth photometering areas and first to third distance measuring areas which overlap the fourth, fifth and sixth photometering areas, respectively, the distance data from the first distance measuring area is selected to focus on the object. If photometering data from the sixth photometering area is used as the main measurement of the object brightness, and if the difference in the main measurement between the sixth photometering area and other photometering area (for example, the second photometering area) is above a predetermined value, it is judged that the object includes backlight. In this judgment, the photometering data of the fourth photometering area corresponding to the first distance measuring area whose distance data is utilized, is not used to detect backlight, and hence it is impossible to judge whether the main object within the first distance measuring area (i.e., the object located within the distance measuring area for which the focusing should be carried out) is actually subject to backlight.

SUMMARY OF THE INVENTION

It is an object of the present invention to eliminate the above-mentioned drawback by providing an exposure control apparatus for a camera in which backlight can be more precisely detected so as to obtain an accurate exposure value.

The basic concept of the present invention resides in acquisition of photometering data of the object, on which the focusing should be carried out, from a focus detection device in a passive focusing device in which object photometering data is employed.

In order to achieve the above mentioned object, there is provided an exposure control apparatus for a camera including: a focus detection device for receiving object light to measure the object distance; a photometering device for receiving object light within a plurality of photometering areas to measure the object brightness; and a backlight detection device for obtaining a main photometering value based on the object light received by the focus detection device, and for detecting the presence of backlight based on the main photometering value and a reference photometering value measured by the photometering device.

Preferably, the focus detection device includes a plurality of distance measuring areas, so that the object distance of an object in one of the distance measuring areas is selected and used for the focusing operation, and wherein the backlight detection device detects the main photometering value based on the object light in the selected distance measuring area.

Preferably, the photometering area which is used for the detection of backlight by the backlight detection device is located in a picture plane closer to the periphery of the picture plane than a central portion thereof.

Preferably, the photometering area which is used for the detection of backlight by the backlight detection device is not overlapped on the selected distance measuring area.

Preferably, the distance measuring device includes a passive distance measuring device which detects a distance between object images formed on a pair of line sensors by a pair of image forming lenses, based on integral values obtained from light receiving elements of the line sensors, so that the object distance can be determined in accordance with the detected distance between the object images. The distance measuring device includes a quantization device for detecting the brightness of the object images formed on the line sensors as an integral time in which the integral value of each light receiving element reaches a predetermined value, and a calculation device for producing output of the integral time of each light receiving element in terms of a relative integral time to a reference integral time which is defined by the integral time in which the integral value reaches first a predetermined value. The backlight detection device determines a real reference (fundamental) brightness which is represented by an actual object brightness corresponding to the reference integral time, so that the actual object brightness can be calculated based on each relative integral time corresponding to the selected distance measuring area, wherein a mean value of the calculated actual object brightness is calculated to define a main photometering value which is used for the detection of backlight.

Preferably, a strobe device is also included for emitting strobe light upon exposure when the backlight detection device detects backlight.

Preferably, an exposure calculation device is also included for calculating an optimal exposure based on the photometering value of the photometering device, wherein when the backlight detection device detects backlight, the exposure calculation device corrects the exposure value in the direction of under exposure based on the detection of backlight.

The present disclosure relates to subject matter contained in Japanese Patent Application No. 10-279990 (filed on Oct. 1, 1998) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENT

The main photometering value, of an object within a distance measuring area focused on via selection by a distance measuring device, and the photometering value obtained by the multi-point photometering device are utilized are used to judge the presence of backlight in an exposure control apparatus according to an embodiment of the present invention.

Figure 1A:
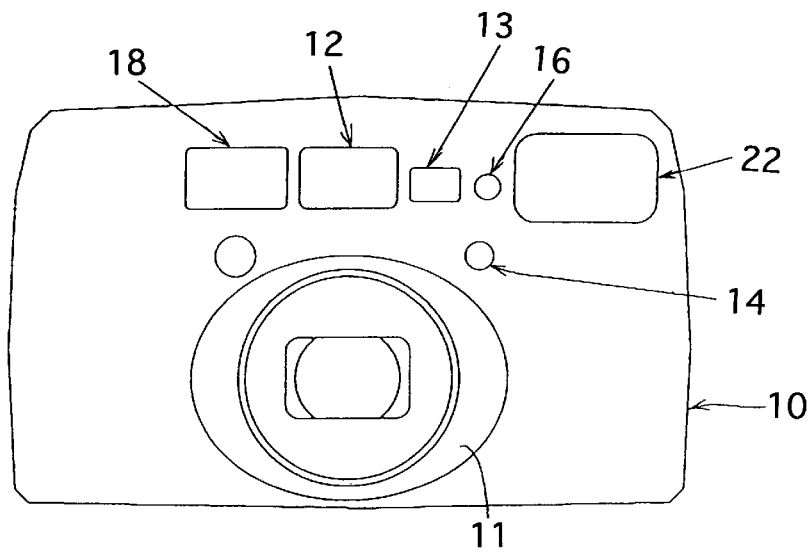
FIGS. 1A through 1C are a front view, a plan view, and a rear view, respectively, of a camera having an exposure control apparatus according to the present invention.
Figure 1B:
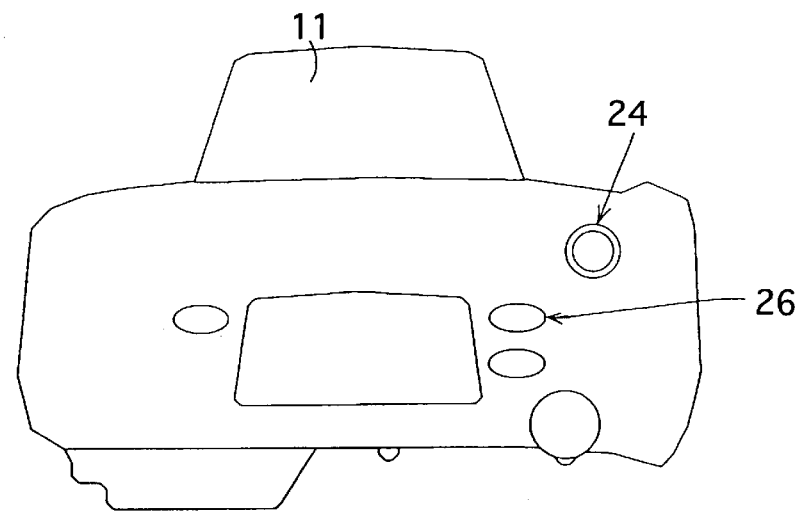
Figure 1C:
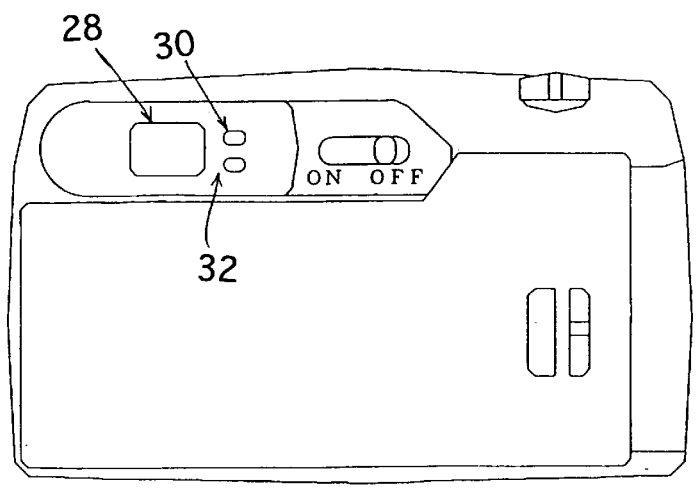

An embodiment of an exposure control device for a camera according to the present invention will be explained with reference to the drawings. FIGS. 1A, 1B and 1C show a front elevational view, a plan view and a rear view of a camera having an exposure control apparatus according to the present invention, respectively.

As shown in FIG. 1A, the camera body 10 is provided on the front face thereof with a zoom lens 11 substantially at a lower median portion thereof. A zoom finder window 12 is provided above the zoom lens 11. A photometering window 13 is located on the right side of the zoom finder window 12. Object light incident on the photometering window 13 is received by a photometering IC 50 (FIG. 3) to measure the brightness of the object. The photometering IC 50 is provided with a sensor area corresponding to a photographing area, which is split into a plurality of photometering areas which are each provided with a split photometering sensor. The photometering IC 50 in the illustrated embodiment is provided with nine photometering areas consisting of peripheral photometering areas 1-1L to 1-4L, upper and lower photometering areas 2L and 3L, left and right photometering areas 4L and 5L, and a central photometering area 6L. The light receiving areas of the photometering sensors correspond to the corresponding photometering areas.

A passive AF sensor portion (passive distance measuring device) 18 measures the distance of an object to be taken from the camera 10 (object distance) based on the phase difference of the object image and the triangulation principle, and is provided with a multi AF sensor unit 51 (FIG. 4) which can independently measure the object distances of the objects in the distance measuring areas. Among the distance data, the shortest object distance is used for the focusing operation in the illustrated embodiment.

Also, in the illustrated embodiment, backlight is detected based on the object brightness (main photometering value) in the distance measuring area, corresponding to the closest object which is determined based on the relative integral time and the integral time in the distance measuring area, and the object brightness obtained by the photometering IC 50. Namely, in the illustrated embodiment, the multi AF sensor unit 51 functions not only as a distance measuring device but also as a photometering device.

A remote control light receiver 14 has an infrared sensor which detects a release signal (infrared radiation) emitted from a remote controller. A self lamp 16 functions as an indicator which is lit or flashes ON and OFF upon photographing operating a self timer provided on the camera 10.

As shown in FIG. 1B, the camera 10 is provided on the upper surface thereof with a release button 24 which is depressed in two steps. When the release button 24 is depressed by a half step, preparatory operations necessary to take a picture are carried out, i.e., the object brightness and distance are measured, and a focusing device moves a focusing lens group. When the release button 24 is fully depressed, the diaphragm and the shutter are actuated to expose and wind the film. A mode switch 26 is adapted to select an operative mode in which the function of the present invention is effective or an inoperative mode in which the function of the present invention is ineffective.

In FIG. 1C, a finder eyepiece 28 is provided on the back surface of the camera 10. The finder eyepiece 28 is viewed through in order to determine a desired composition. An upper green lamp 30 and a lower red lamp 32 serve as indicators, and are provided on the right side of the finder eyepiece 28. In the illustrated embodiment, the green lamp 30 is intermittently turned ON and OFF when the distance measurement fails, and is lit when no error occurs in the distance measurement. The red lamp 32 is lit when the charging of the strobe is complete.

Figure 3:
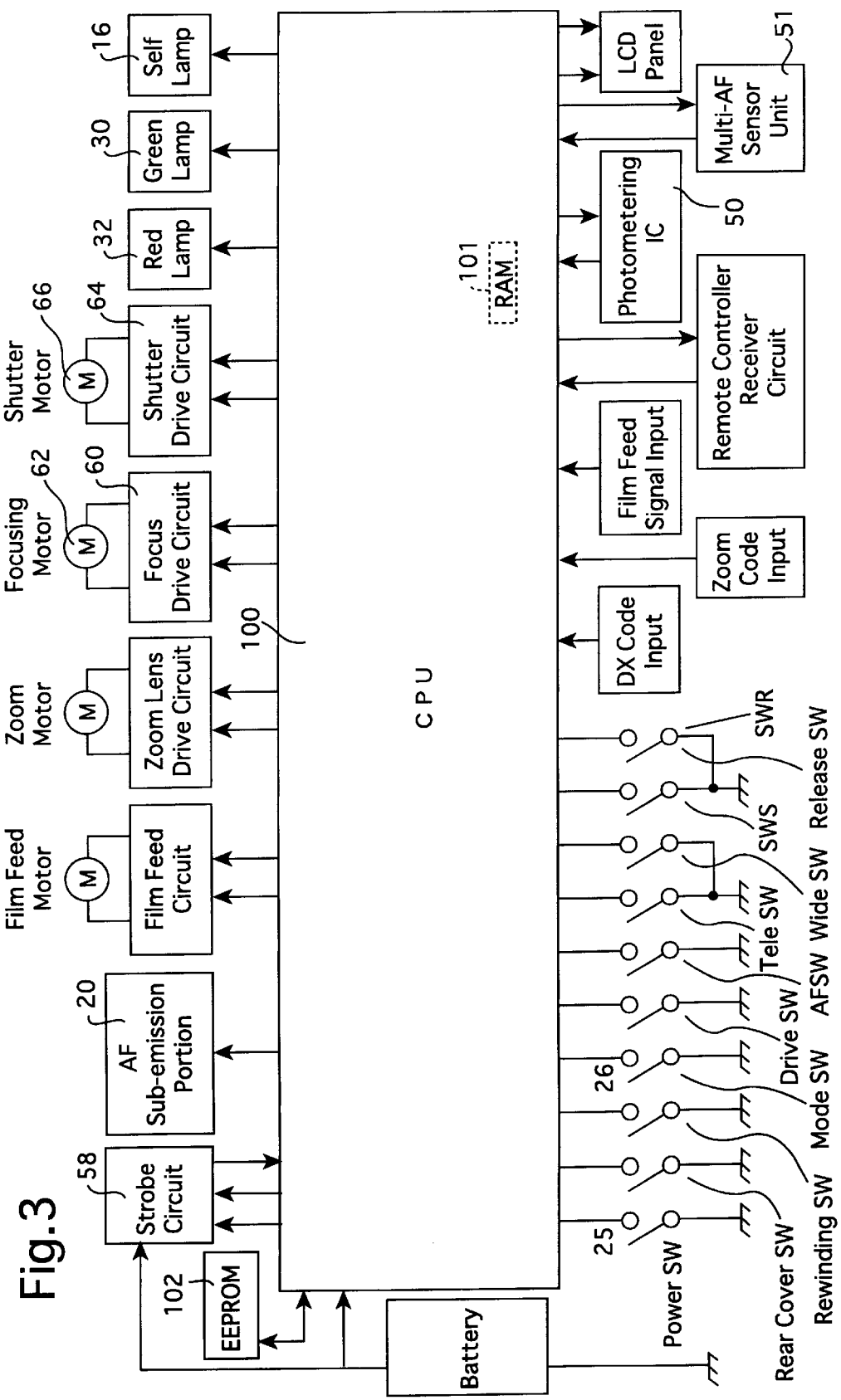
FIG. 3 is a block diagram of an exposure control apparatus for a camera according to the present invention.

FIG. 3 shows a block diagram of an exposure control apparatus for a camera according to the present invention. A power switch is a main switch (ON/OFF switch in FIG. 1C) which is actuated in order to operate the functions of the camera 10. The mode switch 26 is a switch shown in FIG. 1B. The photometering switch SWS and the release switch SWR are associated with the release button 24, so that the photometering switch SWS is turned ON by the half depression of the release button 24 and the release switch SWR is turned ON by the full depression of the release button, respectively.

The photometering IC 50 constitutes a photometering device which receives the object light incident on the photometering window 13 of the camera 10 (FIG. 1A) and determines the object brightness based on the photometering data of the split photometering sensors corresponding to the photometering areas.

The multi AF sensor unit 51 constitutes a distance measuring device which integrates and converts the images formed in the split distance measuring areas to obtain image data and supplies the image data to a CPU 100.

A strobe circuit 58 is adapted to emit strobe light (flash) from a strobe device 22 (FIG. 1A) and constitutes a flashing circuit (strobe emitting circuit) which is actuated, for example, when the quantity of exposing light is insufficient or backlight is detected, etc.

A focus drive circuit 60 drives a focusing motor 62 in accordance with the object distance detected by the multi AF sensor unit 51 to move the lens of the camera 10 to thereby focus on the object. A shutter drive circuit 64 drives a shutter motor 66 to operate the shutter, for example, when the release switch SWR of the camera 10 is turned ON (the release button is fully depressed) or when the release button of the remote controller is depressed.

The green lamp 30 and the red lamp 32 function as indicators when failure to measure the object distance occurs (when the object distance cannot be measured) or when the charging of the strobe is completed, as mentioned above. The green and red lamps are lit in accordance with the signals from the CPU 100.

Figure 2A:
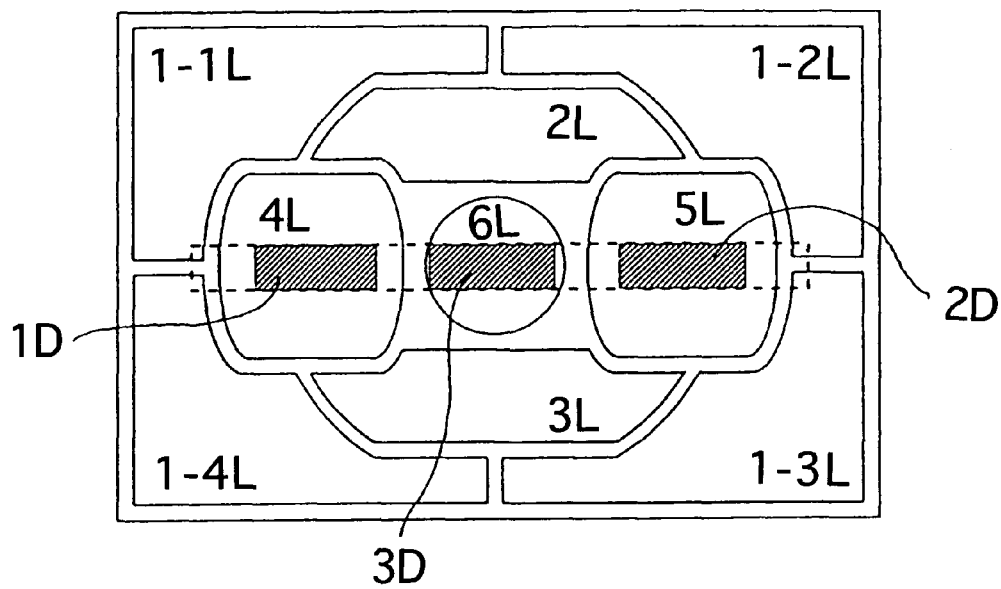
FIGS. 2A and 2B are explanatory views of a positional relationship between photometering areas and distance measuring areas.
Figure 2B:
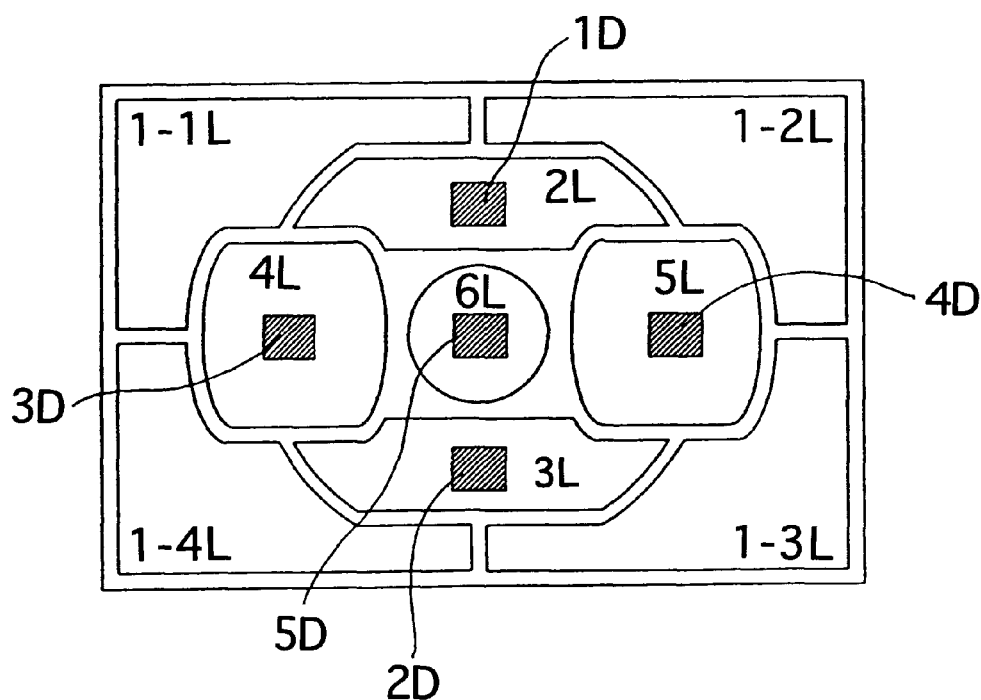

FIGS. 2A and 2B show a shape of the light receiving surfaces (sensor areas) of the photometering IC 50 and the multi AF sensor unit 51 provided behind the photometering window 13 and the AF sensor portion 18, respectively, and show the positional relationship between the photometering and distance measuring areas and a picture surface.

In the embodiment illustrated in FIG. 2A, the photometering area is split into nine areas consisting of peripheral photometering areas 1-1L to 1-4L, upper and lower photometering areas 2L and 3L, left and right photometering areas 4L and 5L, and a central photometering area 6L. The distance measuring area is split into three areas 1D, 2D and 3D. The distance measuring areas 1D, 2D and 3D overlap the photometering areas 4L, 5L and 6L, respectively.

In the embodiment illustrated in FIG. 2B, the photometering area is split into nine areas consisting of peripheral photometering areas 1-1L to 1-4L, upper and lower photometering areas 2L and 3L, left and right photometering areas 4L and 5L, and a central photometering area 6L. The distance measuring area is split into five areas 1D through 5D. The distance measuring areas 1D, 2D, 3D, 4D and 5D are overlapped on the photometering areas 2L, 3L, 4L, 5L and 6L, respectively.

Note that each of the distance measuring areas 1D through SD is overlapped entirely or partly by any one of the photometering areas. The distance measuring areas can be identical to the corresponding photometering areas or can bridge two or more adjacent photometering areas.

In the illustrated embodiments, the photometering IC 50 is provided with split photometering sensors which can independently measure the object brightness for each photometering area and the multi AF sensor unit 51 is provided with a distance measuring sensor which can independently measure the object distance for each distance measuring area. Note that, in the illustrated embodiments, the four peripheral photometering areas 1-1L to 1-4L of the photometering IC 50 define a single peripheral photometering area.

Figure 4:
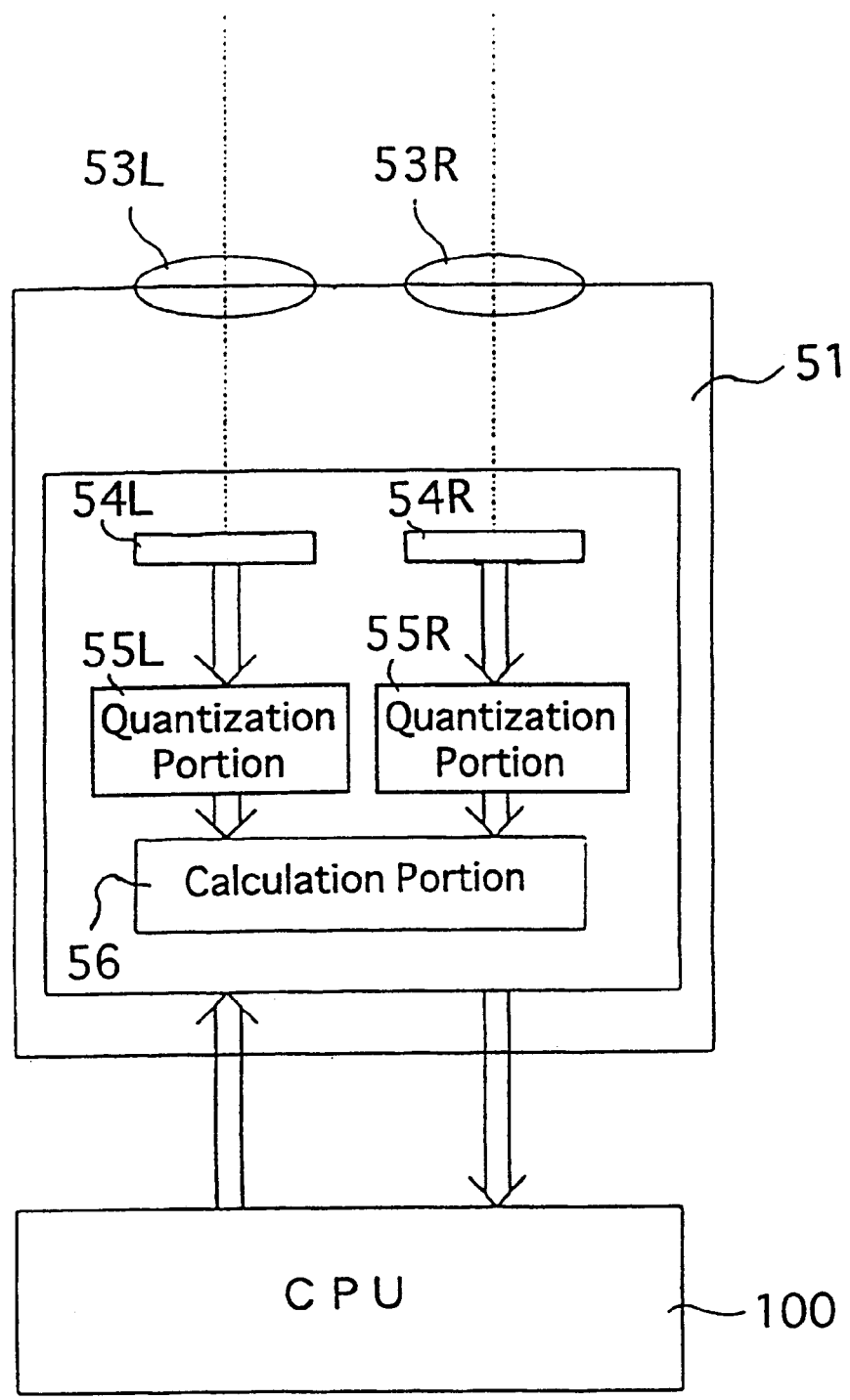
FIG. 4 is a block diagram of an AF sensor unit provided in a camera shown in FIG. 3.

In FIG. 4 shows a block diagram of the multi AF sensor unit 51 corresponding to the arrangement shown in FIG. 2A.

The multi AF sensor unit 51 is provided with left and right image forming lenses 53L and 53R, left and right line sensors 54L and 54R, left and right quantization portions 55L and 55R, and a calculation portion (calculation device) 56. The left and right line sensors 54L and 54R are each provided with an array of photodiodes which are spaced at a predetermined pitch. The left and right image forming lenses 53L and 53R, the left and right line sensors 54L and 54R, and the left and right quantization portions 55L and 55R are identical in construction and operation.

The object light is transmitted through the left and right image forming lenses 53L and 53R and is received by the left and right line sensors 54L and 54R to form object images. Namely, the images of the identical object are formed on the left and right line sensors 54L and 54R through the left and right image forming lenses 53L and 53R, respectively. The left and right imaging lenses 53L and 53R and the left and right line sensors 54L and 54R are configured and arranged to receive the light carrying the object images within the distance measuring areas 1D through 3D. Note that the left and right imaging lenses 53L and 53R are pan-focus lenses.

Each of the photodiodes of the left and right line sensors 54L and 54R receives and converts the object light into electric signals (voltage or current signals) in accordance with the brightness thereof. The electric signals are supplied to the left and right quantization portions 55L and 55R. The left and right quantization portions 55L and 55R convert the quantity of light received by the photodiodes into integral time data. Namely, the input electric signals are integrated and the integral time in which the integral value reaches a predetermined value is measured. Each integral time is stored in a memory located in the calculation portion 56. The integral time is in inverse proportion to the object brightness. Namely, the object brightness increases as the integral time is reduced, and vice versa. Note that the calculation portion 56 converts the first integral time which has reached the predetermined value into a reference integral time. Consequently, the subsequently output integral times are converted into a relative integral time based on the reference integral time and are stored in the memory located in the calculation portion 56 together with the reference integral time.

When the electrical signals of all the photodiodes reach the predetermined integral value and all the integral times are stored in the memory, the calculation portion 56 outputs the stored integral times as image data in the order of the light receiving elements. If the integral value of any of the photodiodes does not reach the predetermined value even after the lapse of a predetermined time, the predetermined time is stored as a relative integral time in connection with the photodiode(s) for which the integral operation has not been completed and is supplied as image data to the CPU 100. The CPU 100 stores the image data in the internal RAM 101 thereof so that the image data can be used to determine the object distance and to detect backlight.

To measure the object distance, i.e., to detect a phase difference, it is necessary to obtain only the relative brightness of the object images received by the light receiving elements, not actual object brightness. The precision of the measurement of the object distance is enhanced by using the brightness over the entire effective calculation range. To this end, in the calculation portion 56, the shortest integral time obtained from the left and right quantization portions 55L and 55R is used as the reference integral time, and the remaining integral times are converted into the relative integral time based on the reference integral time to produce and output the image data. Consequently, the reference integral time and the relative integral time can be converted to an actual brightness, based on the shortest integral time and the relative brightness.

The CPU 100 receives the shortest integral time separate from the image data input from the calculation portion 56. The CPU 100 converts the image data output from the calculation portion 56, upon completion of the integral operation, into the actual brightness based on the shortest integral time, so that the actual brightness can be used to detect backlight.

Figure 5:
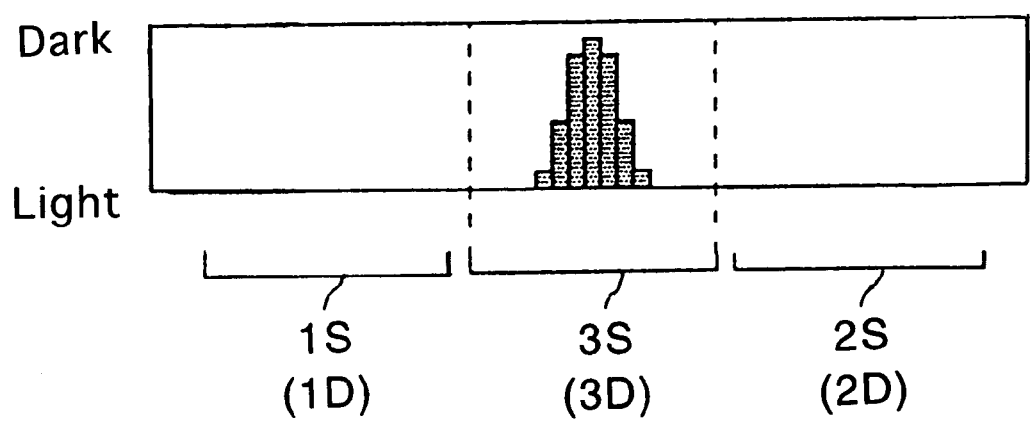
FIG. 5 is a graph which shows a relation between light receiving elements in one of the line sensors of an AF sensor unit and integral time.

FIG. 5 shows a relationship between the photodiodes of the line sensors 54L and the integral time (relative integral time). In FIG. 5, the abscissa represents the direction in which the photodiodes are arrayed and the ordinate (bar graph) represents the integral time of each photodiode. Namely, the quantity of light to be received is smaller (brightness is lower) as the height of the bar graph increases, and vice versa. In other words, FIG. 5 represents the object brightness distribution (phase) on the line sensors. It should be appreciated that, in the illustrated embodiments, the height of the bar graph which represents the brightness (or darkness) corresponds to the counted value of the time for the photodiode having the shortest integral time (i.e., the counted value of the time from the completion of the integral operation for the photodiode which has received the brightest object light to the completion of the integral operation for the remaining photodiodes). Note that in FIG. 5, the sensor areas 1S through 3S correspond to the distance measuring areas 1D through 3D. The object brightness distribution of the object image on the other line sensor 54R is the same as the line sensor 54L.

In the illustrated embodiments, the line sensor 54L is used as a reference line sensor and the other line sensor 54R is used as a contrast (comparison) line sensor. Namely, the brightness distribution identical to that in the distance measuring areas 1D through 3D on the reference line sensor 54L is detected based on the brightness distribution in the corresponding distance measuring areas 1D through 3D on the contrast line sensor 54R, so that the difference (distance) between the brightness distribution (phase difference of the object images) can be detected. Consequently, the object distances of the object images in the distance measuring areas 1D through 3D are obtained based on the detected distribution difference. Assuming that the closest object is the main object, the shortest distance is selected and used to perform the focusing operation.

Based on the image data obtained from one of the sensor areas 1S through 3S, corresponding to the distance measuring areas 1D through 3D from which the selected distance is obtained, and the shortest integral time, the CPU 100 calculates a mean brightness of the selected sensor area, so that the calculated mean brightness can be used as the main brightness (sub photometering value BVaf) to detect backlight. For instance, a difference between the reference photometering value BVd of the peripheral area obtained from the photometering IC 50 and the sub photometering value BVaf as the main brightness is compared with a set value to detect backlight. If backlight is detected, the exposure value is corrected toward over exposure or the strobe light is emitted. Thus, the CPU 100 functions as a judging device.

The CPU 100 receives signals input thereto from input devices (sensors or switches, etc.) connected thereto and controls the operation of individual output devices (various circuits or lamps, etc.) connected to the CPU 100, in accordance with a stored program. Thus, the CPU 100 functions as a distance measuring device, a photometering device, a selection device, a backlight detection device, and a control device, etc. The set value which is used to detect backlight is pre-stored in an EEPROM 102.

The operation of the exposure control apparatus for a camera constructed as above will be discussed below with reference to the flow charts.

Figure 6:
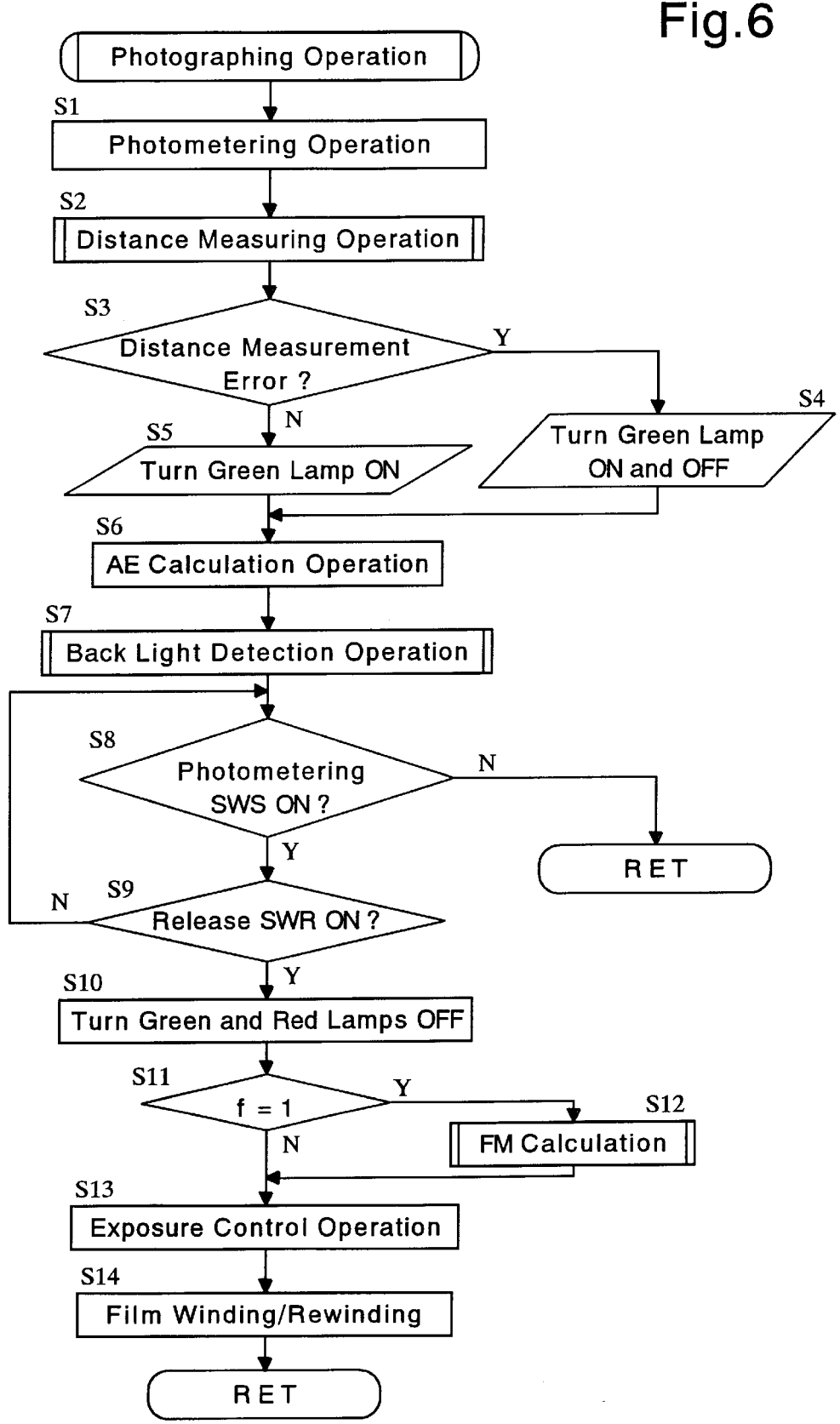
FIG. 6 is a main flow chart of a camera exposure control apparatus according to the present invention.
Figure 7:
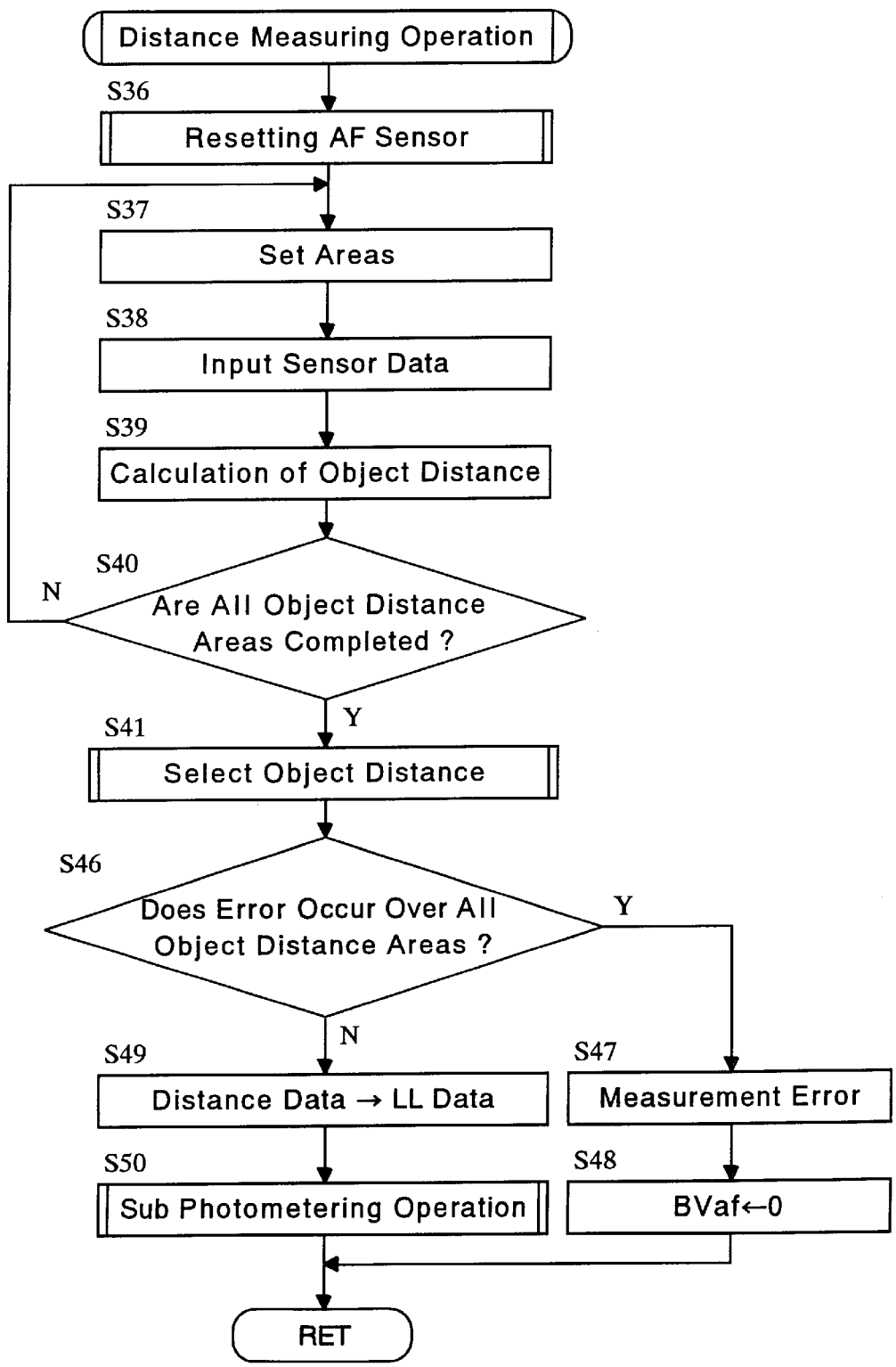
FIG. 7 is a flow chart of a sub routine for a distance measuring operation in a main flow chart shown in FIG. 6.
Figure 10:
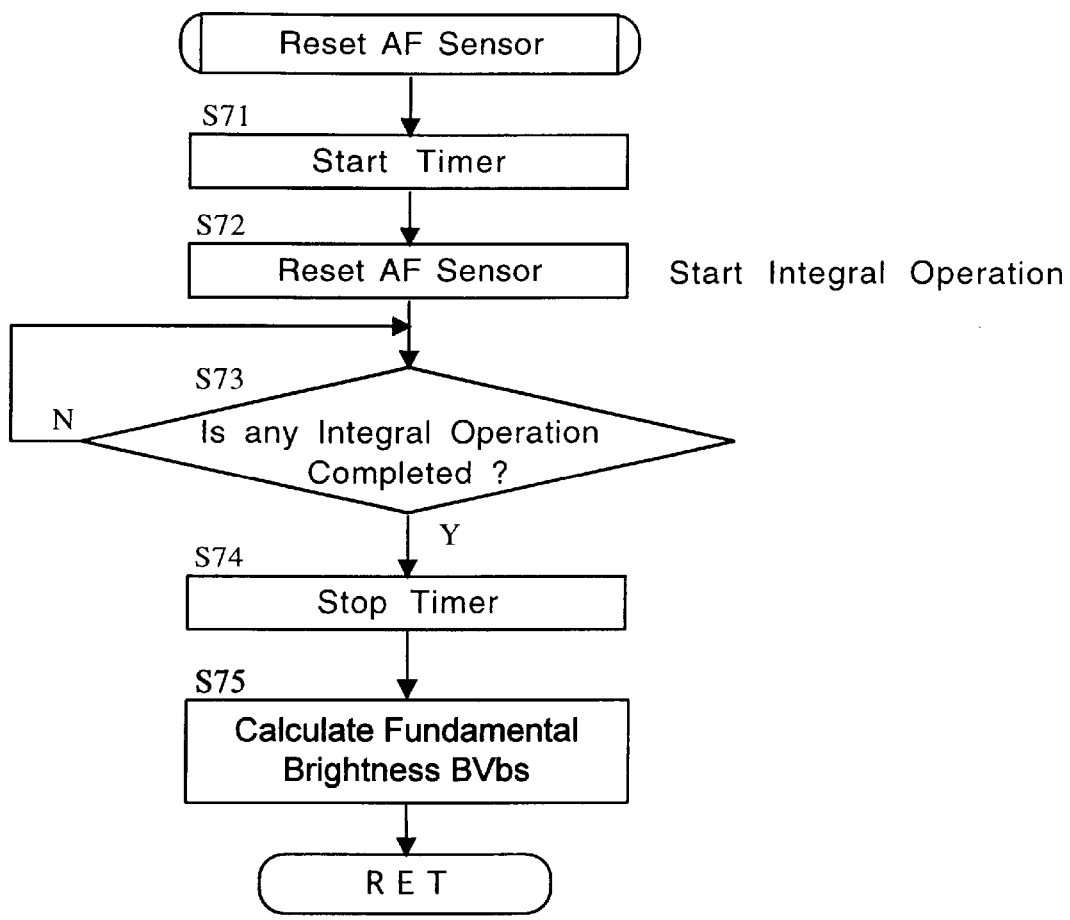
FIG. 10 is a flow chart of a sub routine for an AF sensor reset operation in a distance measuring operation flow chart shown in FIG. 7; and, FIG. 11 is a flow chart of a sub routine for a sub photometering operation in a distance measuring operation flow chart shown in FIG. 7.
Figure 11:
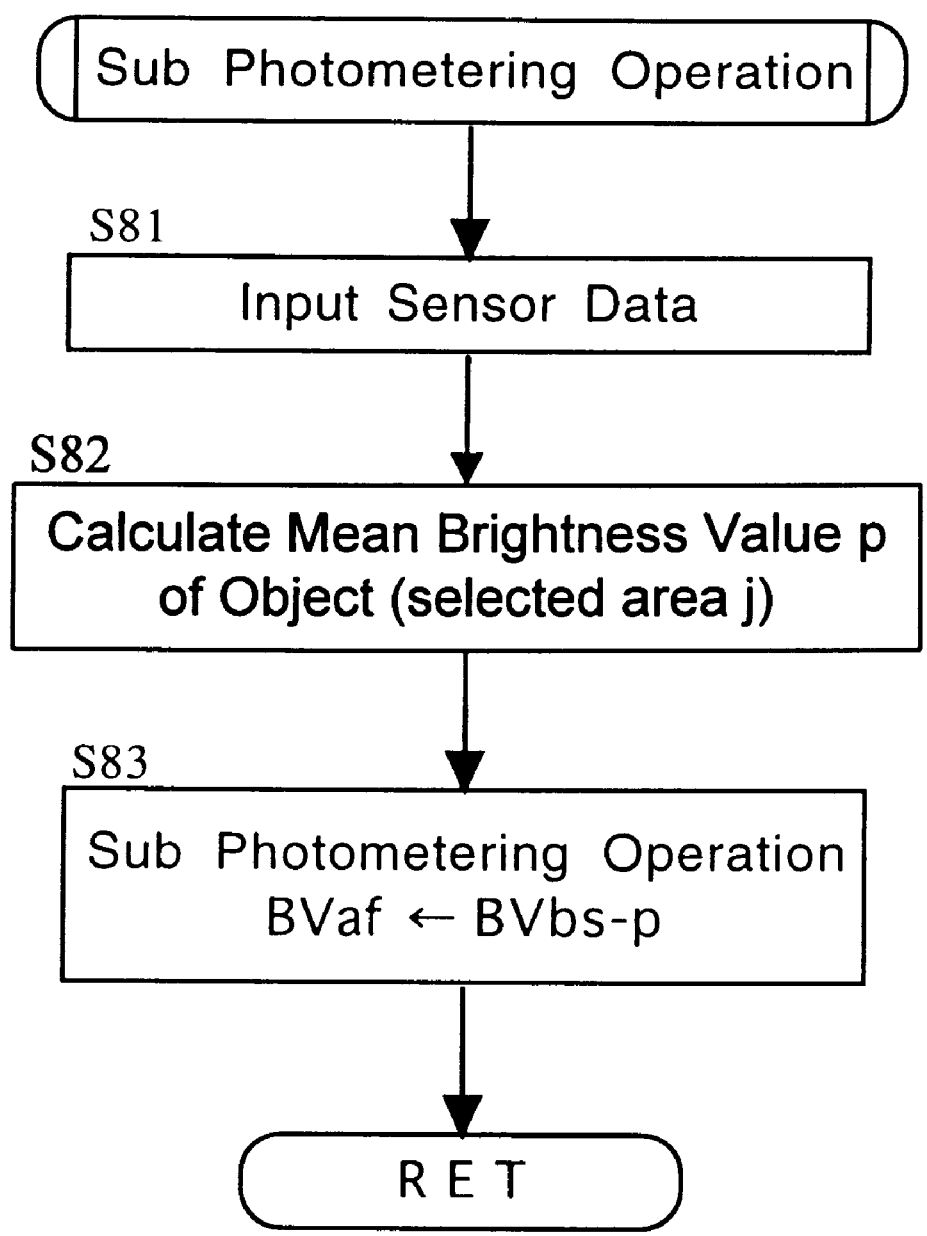

FIG. 6 shows a main flow chart of the exposure control apparatus for a camera. FIGS. 7 thorough 9 show flow charts of sub-routines for the distance measuring operation and the backlight detection operation in the main flow chart shown in FIG. 6. FIG. 10 shows a flow chart of a sub-routine for the AF sensor reset operation in the distance measuring operation flow chart shown in FIG. 7. FIG. 11 shows a flow chart of a sub-routine for the sub photometering operation in the distance measuring operation flow chart shown in FIG. 7.

The photographing operation represented by the main flow chart shown in FIG. 6 begins when the release button 24 is depressed by a half step (photometering switch SWS is turned ON). When the photographing operation begins, the object light incident on the photometering window 13 of the camera 10 is received by the photometering IC 50 whose output signals are sent to the CPU 100, so that the CPU 100 calculates the object brightness in accordance with the output signals of the photometering IC 50 (S1). The brightness of the object in each photometering area, as shown for example in FIG. 2A, is calculated.

Thereafter, the object distance measuring operation is carried out (S2). The detail of the distance measuring operation will be explained hereinafter with reference to the flow chart of FIG. 7. The distance measuring operation is summarized as follows. Namely, the shortest object distance selected from among the object distance data, obtained for the plural distance measuring areas, is used for the object distance.

If a distance measurement error occurs at step S2, for example, due to a measurement of the object distance not occurring (S3:Y), the CPU 100 turns the green lamp 30 ON and OFF (S4). If a distance measurement error does not occur, the CPU 100 turns the green lamp 30 ON (S5).

Thereafter, the AE calculation is carried out to determine the exposure value of the object (shutter speed, diaphragm value) at step S6, and the backlight detection operation is carried out (S7) wherein it is checked whether or not the object receives backlight. The backlight detection operation will be explained in detail hereinafter, with reference to the flow chart shown in FIG. 8.

If the release button 24 is not depressed by a half step, the control is returned without performing subsequent operations since the photometering switch SWS is not turned ON. If the release button 24 is depressed by a half step and the photometering switch SWS is turned ON (S8:Y), and it is checked whether or not the release button 24 is fully depressed to turn the release switch SWR ON (S9). If the release switch SWR is turned ON, the CPU 100 turns the green lamp 30 and the red lamp 32 OFF (S9:Y, S10).

In the backlight detection operation at step S7, if backlight is detected (backlight flag f=1) (S11:Y), the flashmatic (FM) calculation is carried out in which the quantity of the strobe light to be emitted from the strobe device 22 is calculated (S12), and the control proceeds to the exposure control operation (S13). Upon flashing, the quantity of strobe light determined by the calculation is emitted from the strobe device 22.

If no backlight is detected in the backlight detection operation, i.e., if the backlight flag f=0 (S11:N), the exposure control operation and the film rewinding operation are immediately carried out (S13, S14). Namely, the CPU 100 actuates the shutter drive circuit 64 to drive the shutter motor 66 to thereby operate the shutter and wind the film by one frame. If all the film frames have been exposed, the film is rewound.

The distance measurement operation in the main flow chart will be explained with reference to the flow chart shown in FIG. 7.

The distance measuring area to be measured through the multi AF sensor unit 51 is split into, for example, three areas 1D through 3D as shown in FIG. 2A. The object distance is individually measured for each of the distance measuring areas 1D through 3D. The object brightness is detected through the photometering IC 50 for each of the six split photometering areas 1-1L through 1-4L, 2L, 3L, 4L, 5L and 6L. The distance measuring areas 1D, 2D and 3D are overlapped on the photometering areas 4L, 5L and 6L, respectively.

The CPU 100 resets the AF sensor (S36). The CPU 100 selects and sets the first distance measuring area 1D from among the plural distance measuring areas 1D through 3D (sensor areas S1 through S3) at step S37 and inputs the sensor data corresponding to the distance measuring area 1D to calculate the object distance in the distance measuring area (S38, S39). The operations at steps S37 to S39 are carried out for all the distance measuring areas 1D through 3D (S40). The shortest object distance is selected from among the three object distances obtained for the three distance measuring areas (S41).

Thereafter, the CPU 100 performs the measurement error operation (S47) if no effective object distance data can be obtained from any of the distance measuring areas (S46). Thereafter, the sub photometering value BVaf is set to 0, and the control is returned to the main routine (S48). Note that in the distance measurement error operation, the lens drive data (LL data) is set so that the main object is in focus at a predetermined distance (e.g., 2 m, close point) at a point wherein it is most likely for the main object to exist.

If an object distance is obtained in any of the distance measuring areas, the lens drive data (LL data) is replaced with the distance data selected at step S41 (S49). The CPU 100 drives the focusing motor 62 through the focus drive circuit 60 in accordance with the lens drive data (selected distance data) to focus on the object. The sub photometering value BVaf is obtained from the sensor data of the selected distance measuring area j and the control is returned (S50).

Figure 8:
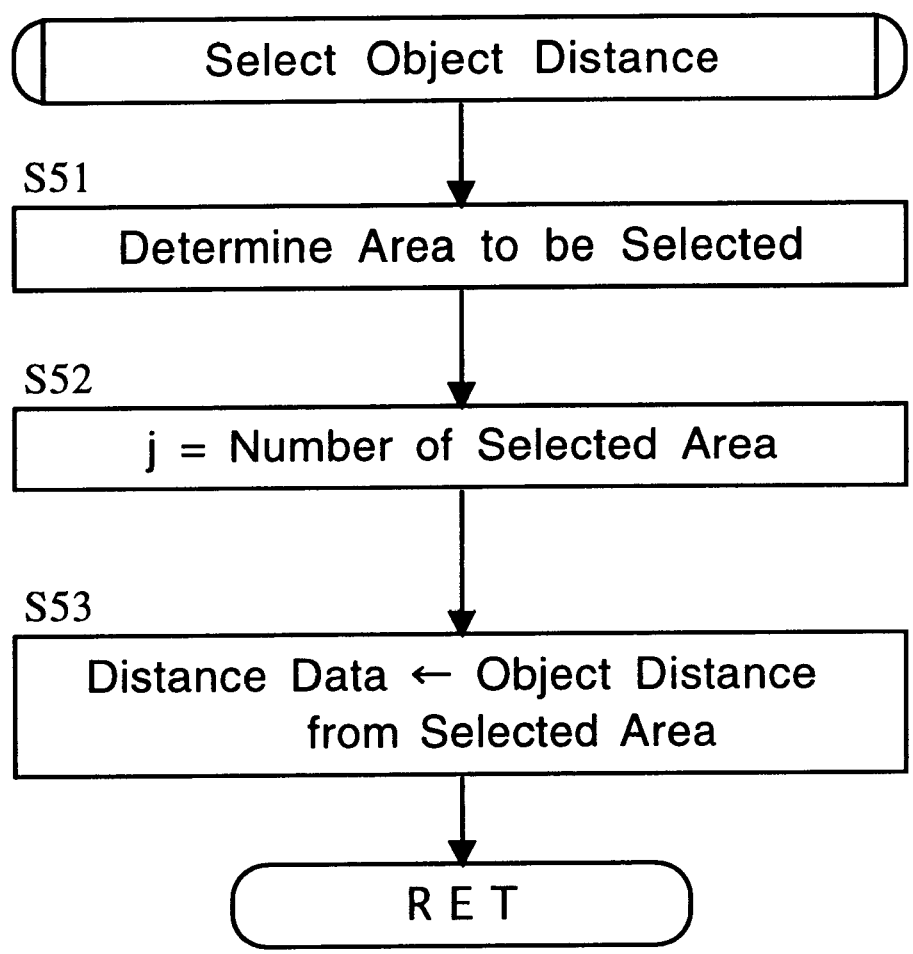
FIG. 8 is a flow chart of a sub routine for a distance selection operation in a distance measuring flow chart shown in FIG. 7.

FIG. 8 shows a flow chart of the sub-routine for the operation at step S41 in the flow chart shown in FIG. 7.

The shortest object distance is selected from the object distances measured in the three distance measuring areas at step S41. The selection operation is carried out as described hereinafter.

The shortest object distance in the three object distances is recognized, and the distance measuring area corresponding to the shortest object distance is determined. For example, if the shortest object distance is obtained from the third distance measuring area 3D shown in FIG. 2A, the selected distance measuring area j is the third area 3D (S51).

Thereafter, the variable j is set to be identical to the number of the selected distance measuring area, i.e., 3D. Namely, j=3D (S52). The object distance obtained in the selected distance measuring area j is set to be the distance data and the control is returned (S53).

Figure 9:
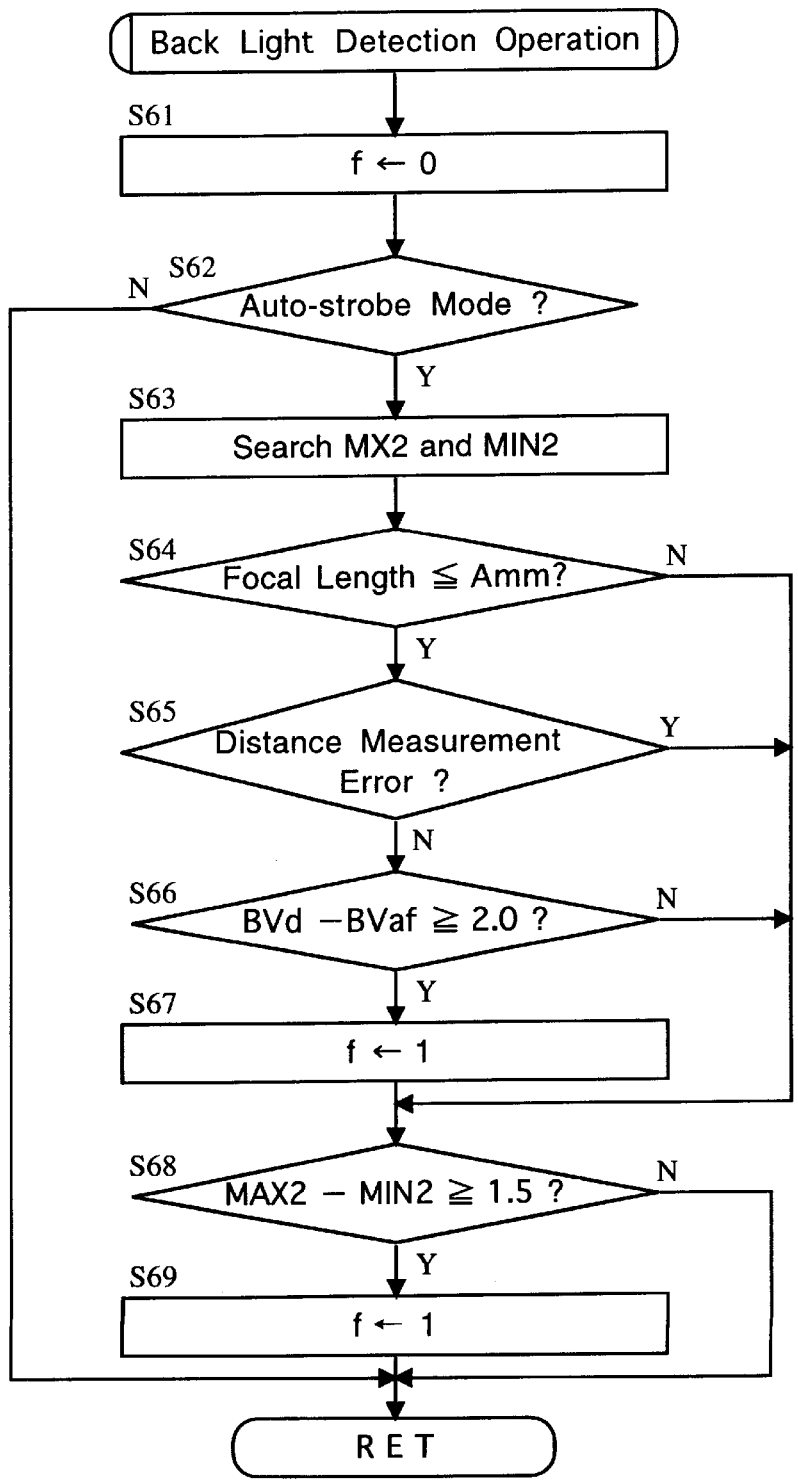
FIG. 9 is a flow chart of a sub routine for a backlight judging operation in a main flow chart shown in FIG. 6.

FIG. 9 shows a flow chart of the sub-routine for the backlight detection in the main flow chart shown in FIG. 6.

In the backlight detection operation, if the effective distance data is selected, the presence of backlight is detected, based on the sub photometering value BVaf obtained from the multi AF sensor unit 51 and the reference photometering value BVd obtained from the photometering IC 50. If no effective distance data is obtained, backlight is detected based only on the brightness obtained from the photometering IC 50.

In the backlight detection operation, the backlight flag f which represents the presence or absence of backlight is set to 0 (S61). Namely, the backlight flag is initialized. Thereafter, it is checked whether the exposure system is at the automatic strobe emission mode. If no automatic strobe emission mode is selected, the control is returned since no strobe light is emitted (S62:Y).

If the automatic strobe emission mode is selected, a predetermined number of photometering data retrieved from the highest photometering data in the order of brightness, for example, the second brightest photometering data (MAX 2) and the second darkest photometering data (MIN 2) are found (S63). For example, in FIG. 2A, the photometering data obtained from the six photometering areas 1-1L~4L through 6L are compared to discover the photometering areas from which the second brightest photometering data (MAX 2) and the second darkest photometering data (MIN 2) are obtained. For the purpose of determining MAX 2 and MIN 2, peripheral areas 1-1L, 1-2L, 1-3L, and 1-4L are considered a single photometering area.

Subsequently, it is checked whether the current focal length is below a predetermined focal length value (A mm) (S64). The predetermined focal length A mm of the zoom lens 11 is determined at a focal length wherein a large amount of the photographic frame (area) is covered by the central photometering area 6L. The focal length of the zoom lens system is detected by the CPU via the zoom code input circuit 35.

If the current focal length is below A mm, it is checked whether the distance measurement error is over the entire distance measuring area (S65). If the measurement error is not over the entire distance measuring area, i.e., if a distance measurement error does not occur at step S2 in FIG. 6 (S65:N), a difference between the sub photometering value BVaf in the selected distance measuring area j, obtained through the multi AF sensor unit 51 and the mean brightness BVd obtained from the peripheral photometering areas 1-1L through 1-4L is calculated. If the brightness difference is above, 2.0 Ev, for example, it is judged that the object has backlight, so that the backlight flag f is set to 1 (S66:Y, S67). If the brightness difference is not above 2.0 Ev, it is judged that no backlight is present, and the control skips S67 (S66:N).

Regardless of whether the focal length exceeds the predetermined value A mm (S64:N), if the object distance cannot be specified due to the effective object distance not being able to be obtained (S64:Y, S65:Y), control skips the backlight detection operation, i.e., control skips steps S66 and S67.

Note that in the illustrated embodiment, if the focal length exceeds the predetermined focal length A mm, the distance measuring areas overlap on the central photometering area 6L.

The difference between the second brightest photometering data (MAX 2) and the second darkest photometering data (MIN 2), obtained from the photometering areas is obtained. If the difference is above 1.5 Ev, for example, it is judged that backlight exists, so that the backlight flag f is set to 1, and the control is returned (S68:Y, S69). This is because there is a possibility that a bright object and a dark object are present in the picture plane even if no backlight is detected for the object in the distance measuring area from which the focal point has been detected. If the difference is not more than 1.5 Ev, it is judged that no backlight exists and the control is returned (S68:N).

FIG. 10 shows a flow chart of a sub routine for the AF sensor reset operation which is carried out at step S36 in the distance measurement operation flow chart shown in FIG. 7. In this embodiment, the shortest integral time from the commencement of the integral operation by the multi AF sensor unit 51 to the first completion of the integral operation is measured, and the fundamental brightness BVbs is obtained in accordance with the measured shortest integral time.

When the control enters the AF sensor reset operation routine, the timer starts and the multi AF sensor unit 51 is reset to commence the integral operation (S71, S72). Thereafter, it is checked whether the integral operation of any of the photo sensors is completed (S73).

If the integral operation of any photo sensor is completed, the timer is stopped and the shortest integral time is measured (S73:Y, S74). Thereafter, the fundamental brightness BVbs is obtained based on the shortest integral time (S75).

FIG. 11 shows a flow chart of a sub-routine for the sub photometering operation which is carried out at step S50 in the distance measurement operation shown in FIG. 7. In this sub photometering operation, the mean brightness p corresponding to the selected distance measuring area j is calculated based on the image data input from the multi AF sensor unit 51, and the mean brightness p is subtracted from the fundamental brightness BVbs to obtain the absolute photometering value of the distance measuring area, i.e., the sub photometering value BVaf.

In the sub photometering operation, the image data input from the multi AF sensor unit 51 and written in the RAM 101 is read (S81), and the mean brightness p is obtained based on the data of the selected distance measuring area j (S82). Thereafter, the sub photometering value BVaf is obtained based on the mean brightness p and the fundamental brightness BVbs (S83), and the control is returned.

As can be understood from the foregoing, if the object distance is measured, backlight is detected in accordance with a difference between the (main) photometering value for the object in the distance measuring area which is used for the focusing operation and the photometering value (reference photometering value) in the peripheral photometering area, obtained by the photometric sensor. If there is measurement error, backlight is detected in accordance with the difference between the second brightest photometering data and the second darkest photometering data, obtained by the photometric sensor.

In the exposure control apparatus, in order to detect backlight, the photometering data obtained from the sensor area corresponding to the distance measuring area is used, and hence more precise detection of backlight for the main object whose distance has been measured can be attained, thus resulting in an optimum exposure.

Moreover, in the case of the distance measurement error, since the brightness difference between the second brightest photometering data and the second darkest photometering data, obtained by the photometric sensor is used, it is possible to detect backlight for the main object more precisely than by comparing the maximum brightness and the minimum brightness.

Although the above discussion has been directed to an embodiment applied to a lens shutter camera, the present invention can be equally applied to a single lens reflex camera.

As can be understood from the above discussion, according to the present invention, since backlight is detected based on the difference between the photometering value obtained from the sensor data corresponding to the distance measuring area (from which the distance data to be used for the focusing operation) has been obtained through the distance measuring device, and the photometering value is obtained from the multi-photometering device, the detection can be precisely and reliably carried out for the main object in focus.

Moreover, since the object distance value in one of a plurality of distance measuring areas is selected and used for the focusing operation, and the photometering value detected based on the object light in the selected focus detection area is used for the detection of backlight, detection can be precisely and reliably carried out for the main object in focus.

Furthermore, since the image data concerning the object photometering value obtained from the line sensors of the distance measuring device is used, it is possible to detect backlight based on the image data of the object within the distance measuring area which has been used for the focusing operation and thus, the judgment can be more precisely and reliably carried out for the main object in focus.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An exposure control apparatus for a camera comprising:
   a focus detection device for receiving object light to measure the object distance;
   a photometering device for receiving object light within a plurality of photometering areas to measure the object brightness; and
   a backlight detection device for obtaining a main photometering value based on the object light received by the focus detection device, and for detecting the presence of backlight based on the main photometering value and a reference photometering value measured by the photometering device.

2. An exposure control apparatus according to claim 1, wherein said focus detection device comprises a plurality of distance measuring areas, so that the object distance of an object in one of the distance measuring areas is selected and used for the focusing operation, and wherein said backlight detection device detects the main photometering value based on the object light in the selected distance measuring area.

3. An exposure control apparatus according to claim 1, wherein the photometering area which is used for the detection of backlight by the backlight detection device is located in a picture plane closer to the periphery of the picture plane than a central portion thereof.

4. An exposure control apparatus according to claim 2, wherein the photometering area which is used for the detection of backlight by the backlight detection device is not overlapped on the selected distance measuring area.

5. An exposure control apparatus according to claim 1, wherein said distance measuring device comprises a passive distance measuring device which detects a distance between object images formed on a pair of line sensors by a pair of image forming lenses, based on integral values obtained from light receiving elements of the line sensors, so that the object distance can be determined in accordance with the detected distance between the object images, said distance measuring device comprises a quantization device for detecting the brightness of the object images formed on the line sensors as an integral time in which the integral value of each light receiving element reaches a predetermined value, and a calculation device for producing output of the integral time of each light receiving element in terms of a relative integral time to a reference integral time which is defined by the integral time in which the integral value reaches first a predetermined value, said backlight detection device determines a real fundamental brightness which is represented by an actual object brightness corresponding to the reference integral time, so that the actual object brightness can be calculated based on each relative integral time corresponding to the selected distance measuring area, wherein a mean value of the calculated actual object brightness is calculated to define a main photometering value which is used for the detection of backlight.

6. An exposure control apparatus according to claim 1, further comprising a strobe device for emitting strobe light upon exposure when the backlight detection device detects backlight.

7. An exposure control apparatus according to claim 1, further comprising an exposure calculation device for calculating an optimal exposure based on the photometering value of the photometering device, wherein when the backlight detection device detects backlight, the exposure calculation device corrects the exposure value in the direction of under exposure based on the detection of backlight.

* * * * *